United States Patent
Shimojou et al.

(10) Patent No.: US 10,284,495 B2
(45) Date of Patent: May 7, 2019

(54) SLICE MANAGEMENT SYSTEM AND SLICE MANAGEMENT METHOD FOR DYNAMICALLY ADJUSTING RESOURCES ALLOCATED TO A SLICE BASED ON A RESOURCE UTILIZATION STATUS

(71) Applicant: NTT DOCOMO, INC., Chiyoda-ku (JP)

(72) Inventors: Takuya Shimojou, Chiyoda-ku (JP); Yusuke Takano, Chiyoda-ku (JP); Motoshi Tamura, Chiyoda-ku (JP); Ashiq Khan, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 170 days.

(21) Appl. No.: 15/327,696

(22) PCT Filed: Mar. 11, 2016

(86) PCT No.: PCT/JP2016/057828
§ 371 (c)(1),
(2) Date: Jan. 20, 2017

(87) PCT Pub. No.: WO2016/152587
PCT Pub. Date: Sep. 29, 2016

(65) Prior Publication Data
US 2017/0208019 A1    Jul. 20, 2017

(30) Foreign Application Priority Data
Mar. 20, 2015    (JP) .................................. 2015-058716

(51) Int. Cl.
*G06F 15/173*    (2006.01)
*H04L 12/911*    (2013.01)
(Continued)

(52) U.S. Cl.
CPC .......... *H04L 47/82* (2013.01); *H04L 12/4641* (2013.01); *H04L 41/0896* (2013.01);
(Continued)

(58) Field of Classification Search
CPC ... H04L 47/82; H04L 47/805; H04L 41/0896; H04L 41/5054; H04L 41/0893
(Continued)

(56) References Cited

U.S. PATENT DOCUMENTS

2012/0233302 A1* 9/2012 Kallin ................. H04L 41/5054
709/226
2015/0142958 A1    5/2015 Tamura et al.
(Continued)

FOREIGN PATENT DOCUMENTS

JP    2009-267525 A    11/2009
WO    WO 2013/172107 A1    11/2013

OTHER PUBLICATIONS

International Preliminary Report on Patentability and Written Opinion dated Oct. 5, 2017 in PCT/JP2016/057828.
(Continued)

*Primary Examiner* — Bharat Barot
(74) *Attorney, Agent, or Firm* — Oblon, McClelland, Maier & Neustadt, L.L.P.

(57) ABSTRACT

A slice management system and a slice management method that can dynamically adjust the amount of resources when the amount of resources is insufficient to create a slice. A storing unit of a NFVO stores slice utilization status information. In a BSS/OSS, an allocation determination unit determines to create a new slice or extend an existing slice, and when resources for creation of a new slice or extension of an existing slice are insufficient, a resource change determination unit determines a slice for reduction based on
(Continued)

the slice utilization status information. A resource request unit of the NFVO reduces resources of the determined slice.

4 Claims, 11 Drawing Sheets

(51) Int. Cl.
*H04L 12/46* (2006.01)
*H04L 12/24* (2006.01)
*H04L 12/927* (2013.01)

(52) U.S. Cl.
CPC ........ *H04L 41/5054* (2013.01); *H04L 47/805* (2013.01); *H04L 41/0893* (2013.01)

(58) Field of Classification Search
USPC ................................................ 709/225–229
See application file for complete search history.

(56) References Cited

U.S. PATENT DOCUMENTS

| | | | |
|---|---|---|---|
| 2017/0054595 A1* | 2/2017 | Zhang | H04L 41/0896 |
| 2017/0079059 A1* | 3/2017 | Li | H04W 16/02 |
| 2017/0086118 A1* | 3/2017 | Vrzic | H04W 36/26 |
| 2017/0093748 A1 | 3/2017 | Kallin et al. | |
| 2017/0141973 A1* | 5/2017 | Vrzic | H04L 41/5054 |

OTHER PUBLICATIONS

Communication pursuant to Article 94(3) EPC dated Apr. 20, 2018 in Patent Application No. 16 768 490.1.
Extended Search Report dated Jan. 8, 2018 in European Patent Application No. 16768490.1, 8 pages.

* cited by examiner

Fig.4

SLICE MANAGEMENT TABLE

| SLICE ID | AVAILABLE NODE | CAPABILITY OF MOBILITY CONTROL | POSSIBLE ACCESS AREA RANGE | SERVICE USE TIME | AVAILABLE BANDWIDTH | MINIMUM DELAY TIME | MINIMUM PACKET LOSS | RESOURCE UTILIZATION RATE | FLAG FOR AVAILABILITY OF RECEIPT OF MULTIPLE SERVICES |
|---|---|---|---|---|---|---|---|---|---|
| Slice1 | SERVER SV1, SWITCH SW1, ... | CAPABLE | KANTO AREA | 24H AVAILABLE | 1G | 3s | 2% | 30% | 0 |

*Fig.5*

HARDWARE UTILIZATION STATUS TABLE

| HW NAME | SLICE USED | ALLOCATED RESOURCES | RESOURCE UTILIZATION RATE | EXCESS RESOURCES |
|---|---|---|---|---|
| SERVER 1 | SLICE 1<br>SLICE 2<br>SLICE 3 | 1Core, 500MB<br>1Core, 500MB<br>2Core, 1GB | 20%<br>20%<br>20% | 10Core,<br>10GB |
| SERVER 2 | SLICE 1<br>SLICE 2 | 1Core, 500MB<br>1Core, 500MB | 30%<br>10% | 4Core,<br>5GB |
| SWITCH 1 | SLICE 1<br>SLICE 3 | 2Core, 1GB<br>1Core, 1GB | 20%<br>50% | 1Core,<br>1GB |
| ... | | | | |

Fig. 6

SLICE UTILIZATION STATUS TABLE

| SLICE NUMBER | HARDWARE ID | RESOURCES | MEMORY UTILIZATION RATE | CPU UTILIZATION RATE | STORAGE UTILIZATION RATE | BANDWIDTH UTILIZATION RATE |
|---|---|---|---|---|---|---|
| Slice1 | VM00001 | SERVER 1(2Core, 1GB) | 40% | 30% | 30% | 50% |
|  | queue00001 | SW1(100Mbps) |  |  |  | 30% |
|  | queue00002 | SW2(100Mbps) |  |  |  | 30% |
|  | VM00002 | SERVER 2(2Core, 500MB) | 50% | 30% | 30% | 50% |
| Slice2 | VM00003 | SERVER 1(2Core, 1GB) | 50% | 30% | 30% | 50% |
|  | queue00003 | SW1(100Mbps) |  |  |  | 30% |
|  | queue00004 | SW4(100Mbps) |  |  |  | 30% |
|  | VM00004 | SERVER 2(2Core, 500MB) | 10% | 10% | 10% | 10% |

Fig. 7

SERVICE MANAGEMENT TABLE

| SERVICE ID | MOBILITY CONTROL | ACCESS AREA RANGE | SERVICE USE TIME | ALLOWABLE LOWER LIMIT BANDWIDTH | ALLOWABLE DELAY TIME | ALLOWABLE PACKET LOSS | FUNCTION | ISOLATION FLAG |
|---|---|---|---|---|---|---|---|---|
| SERVICE 1 | NEED | TOKYO | 10:00~22:00 | 500M | 30s | 2% | USER AUTHENTICATION, VIDEO DISTRIBUTION | 0 |

Fig.8

| SERVICE CORRESPONDENCE SLICE MANAGEMENT TABLE ||
|---|---|
| SERVICE ID | SLICE ID |
| SERVICE 1 | Slice1 |

Fig.9

HARDWARE TABLE

| HW NAME | AMOUNT OF RESOURCES | AMOUNT OF ELECTRICITY |
|---|---|---|
| SERVER 1 | 4Core, 2GB | ○○W |

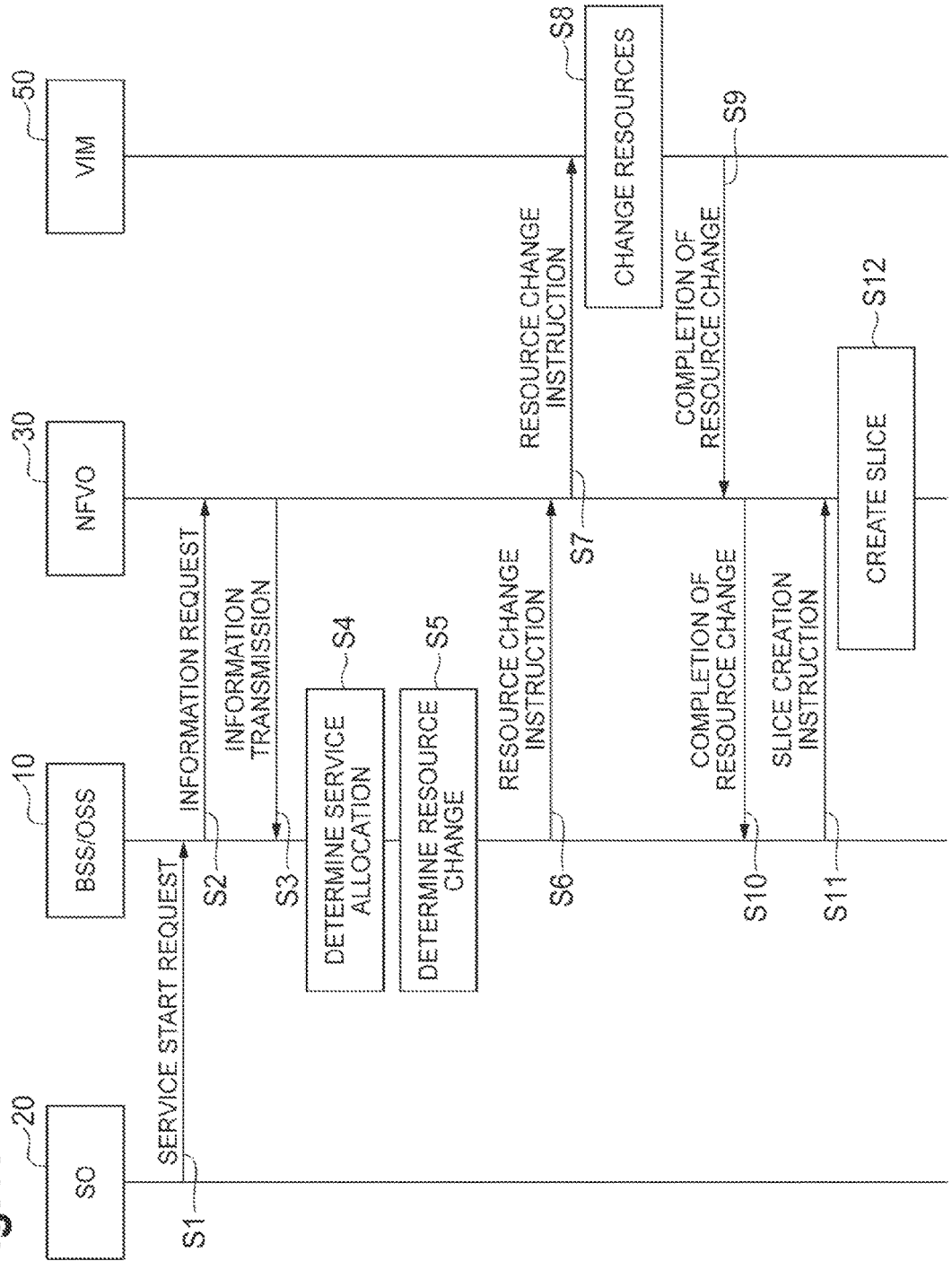

SLICE MANAGEMENT SYSTEM AND SLICE MANAGEMENT METHOD FOR DYNAMICALLY ADJUSTING RESOURCES ALLOCATED TO A SLICE BASED ON A RESOURCE UTILIZATION STATUS

TECHNICAL FIELD

The present invention relates to a slice management system and a slice management method.

BACKGROUND ART

A network system using existing virtualization technology virtually divides hardware resources to create slices, which are virtual networks that are logically constructed on a network infrastructure, with use of the virtualization technology disclosed in Non Patent Literature 1. The system then allocates a service to each of the slices and thereby provides the service using a network in each of the slices that are isolated from one another. Thus, when allocating a slice to each of services having a variety of requirements, it is possible to easily satisfy the requirement of each service and thereby reduce the signaling loads and the like.

CITATION LIST

Non Patent Literature

NPL1: Akihiro Nakao, "Virtualization-node project: Virtualization technology for new generation network", [online], June 2010, National Institute of Information and Communications Technology, [Searched on Mar. 16, 2015], Internet <http://www.nict.go.jp/publication/NICT-News/1006/01.html>

SUMMARY OF INVENTION

Technical Problem

However, there is a case where the amount of hardware resources to be allocated to a slice is insufficient, which causes a problem that a slice corresponding to a new service cannot be created, or, even when it is created, the operation of the system becomes unstable.

The present invention has been accomplished to solve the above problems and an object of the present invention is thus to provide a slice management system and a slice management method that can dynamically adjust the amount of resources in the case where the amount of resources is insufficient when creating a slice.

Solution to Problem

To achieve the above object, a slice management system according to one embodiment of the present invention is a slice management system that manages a slice being a virtual network created on a network infrastructure, and the system includes a resource utilization status information storage means configured to store information of a utilization status of resources allocated to created slices, and a resource change means configured to specify a slice based on the information of the resource utilization status stored in the resource utilization status information storage means in accordance with predication information of the resource utilization status by creation of a new slice or extension of an existing slice, and reduce an amount of resources allocated to the slice.

A slice management method according to one embodiment of the present invention is a slice management method executed in a slice management system that manages a slice being a virtual network created on a network infrastructure, and the method includes a resource change step of specifying a slice based on information of a utilization status of resources allocated to created slices in accordance with predication information of the resource utilization status by creation of a new slice or extension of an existing slice, and reducing an amount of resources allocated to the slice.

According to the slice management system and the slice management method described above, because the amount of resources of an existing slice is reduced by using information of a utilization status of resources allocated to created slices in accordance with predication information of the resource utilization status by creation of a new slice or extension of an existing slice, it is possible to dynamically adjust the amount of resources.

In the above-described slice management system, a slice may be specified when resources are found to be insufficient from the information of the resource utilization status and the predication information. Further, in the resource change step, a slice may be specified when resources are found to be insufficient from the information of the resource utilization status and the predication information. In this case, even when resources for creation of a new slice or extension of an existing slice are insufficient, it is possible to create a new slice or extend an existing slice by reducing the amount of resources of an existing slice.

Further, in the above-described slice management system, the resource change means may specify the slice where resources are to be reduced when resources for creation of a new slice or extension of an existing slice are found to be insufficient as a result of responding to a request for allocating a slice to a service using the virtual network. Further, in the resource change step, the slice where resources are to be reduced may be specified when resources for creation of a new slice or extension of an existing slice are found to be insufficient as a result of responding to a request for allocating a slice to a service using the virtual network. In this case, because the slice management system carries out the reduction of resources to be allocated to a slice at the time of receiving a service request, it is possible to dynamically adjust the amount of resources so that the slice can be allocated to the service.

Advantageous Effects of Invention

According to one embodiment of the present invention, it is possible to dynamically adjust the amount of resources so that a slice can be allocated to a service.

BRIEF DESCRIPTION OF DRAWINGS

FIG. 4 is a view showing a slice management table.
FIG. 5 is a view showing a hardware utilization status table.
FIG. 6 is a view showing a slice utilization status table.

FIG. 7 is a view showing a service management table.

FIG. 8 is a view showing a service correspondence slice table.

FIG. 9 is a view showing a hardware table.

FIG. 10 is a hardware configuration diagram of BSS/OSS and the like.

FIG. 11 is a sequence chart according to an embodiment of the present invention.

DESCRIPTION OF EMBODIMENTS

Embodiments of a slice management system and a slice management method according to the present invention are described hereinafter with reference to the drawings. Note that, in the description of the drawings, the same elements are denoted by the same reference symbols and redundant description thereof is omitted.

Figure 1:
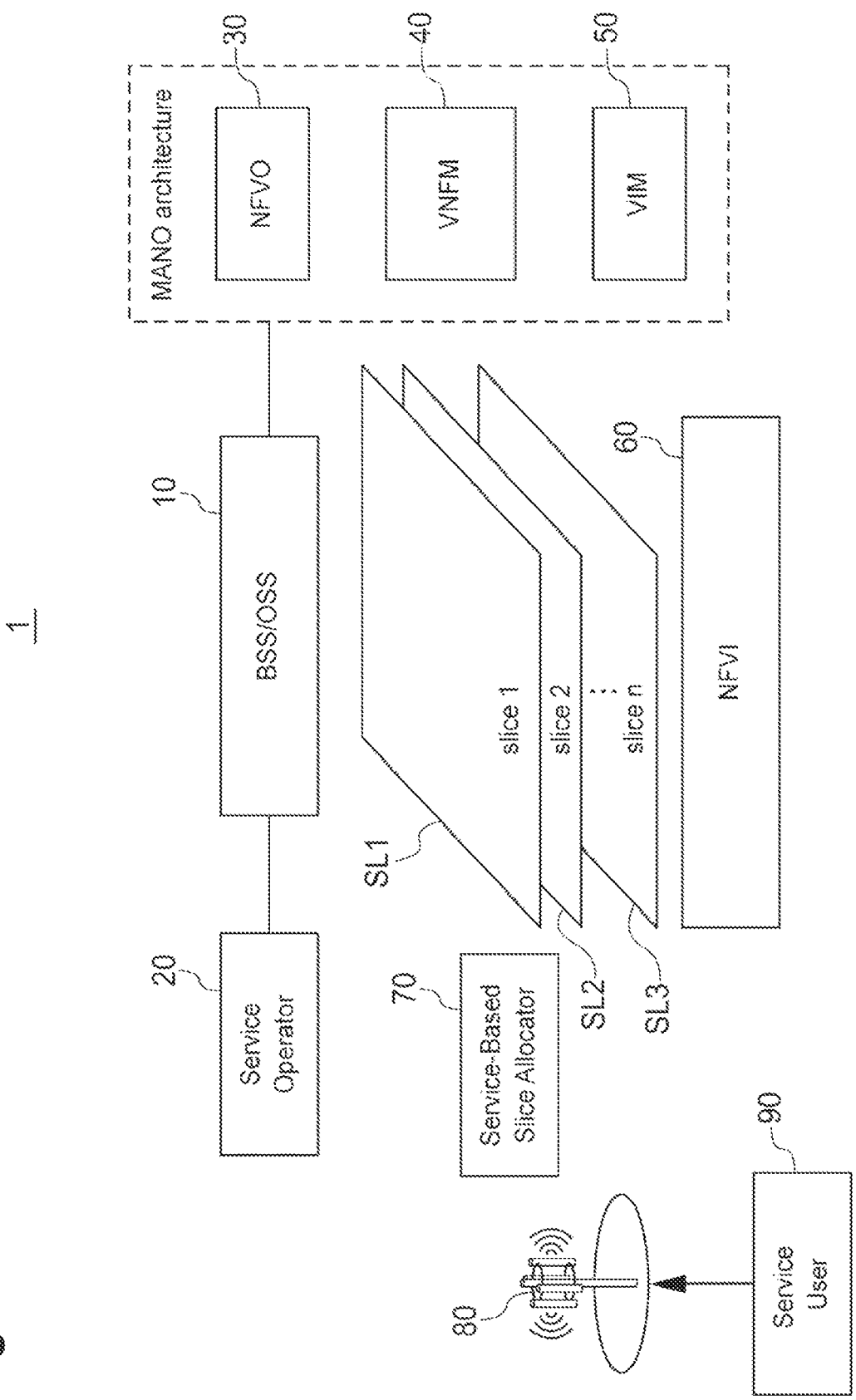
FIG. 1 is a view showing the configuration of a system according to an embodiment of the present invention.

FIG. 1 shows the configuration of a system 1 (slice management system) that includes a BSS/OSS 10 and an NFVO 30 according to this embodiment. The system 1 is a system that allocates a service to a slice, which is a virtual network. The slice is a virtual network or service network that is logically created on a network infrastructure by virtually dividing link and node resources of a network device and coupling the divided resources, and resources in the slices are isolated from one another and do not interfere with one another. The service is a service using network resources such as a communication service (a leased line service etc.) and an application service (a video distribution service, a service using a sensor device such as an embedded device etc.).

As shown in FIG. 1, the system 1 is composed of BSS/OSS (Operations Support System/Business Support System) 10, SO (Service Operator) 20, NFVO30, VNFM40, and VIM (Virtualized Infrastructure Management) 50. Further, the system 1 is composed of NFVI (NFV (Network Functions Virtualisation) Infrastructure) 60, SB SA (Service-Based Slice Allocator) 70, base station 80, and SU (Service User) 90. The NFVO 30, the VNFM 40 and the VIM 50 are MANO (Management & Orchestration) architecture.

Those elements constitute a core network of the system 1. Note that the elements that need to transmit and receive information to and from each other are connected by wired connections or the like so that they can transmit and receive information.

The system 1 according to this embodiment provides a communication function to a mobile communication terminal by a virtual server that operates in a virtual machine which is implemented on a physical server. Specifically, the system 1 is a virtualized mobile communication network. The communication function is provided to the mobile communication terminal by executing communication processing corresponding to the communication function by the virtual machine.

The NFVI 60 is a network that is formed by physical resources (a group of nodes) that constitute a virtualized environment. Conceptually, the physical resources include computational resources, storage resources and transmission resources. The physical resources are composed of nodes such as a physical server, which is a physical server device that performs communication processing in the system 1, and switches. The physical server is composed of a CPU (core, processor), a memory, and a storage means such as a hard disk. Generally, nodes such as physical servers that constitute the NFVI 60 are collectively located in a point such as a data center (DC). In the data center, the physical servers located therein are connected by a network in the data sensor, so that they can transmit and receive information to and from each other. Further, there are a plurality of data centers in the system 1. The data centers are connected by a network, and physical servers located in different data centers can transmit and receive information to and from each other through the network.

The SO (Service Operator) 20 is a device that requests a service, and it is, for example, a terminal device (e.g., personal computer etc.) of a business operator that provides services to various users with use of virtual networks.

The BSS/OSS 10 is a node that performs service management in the system 1 and gives instructions related to the communication function in the system 1. For example, the BSS/OSS 10 gives an instruction to add a new communication function (communication service) to the NFVO 30. Further, the BSS/OSS 10 can be operated by a telecommunications carrier related to the system 1.

The NFVO 30 is an overall management node (functional entity) that performs management of all virtual networks (slices) constructed on the NFVI 60, which is a physical resource. The NFVO 30 receives an instruction from the BSS/OSS 10 and performs processing in accordance with the instruction. The NFVO 30 performs management of all virtualized networks constructed in the physical resources of the mobile communication network of the infrastructure and communication service. The NFVO 30 implements the communication service that is provided by a virtual network in an appropriate place via the VNFM 40 and the VIM 50. For example, service life cycle management (specifically, creation, update, scale control, event collection, etc.), resource distribution, reservation and allocation management in the entire mobile communication network, service instance management, and policy management (specifically, optimal placement based on resource reservation, allocation, geography, laws and regulations etc.)

The VNFM 40 is a virtual communication function management node (functional entity) that adds a function related to a service to the NFVI 60, which is a physical resource (node). A plurality of VNFMs 40 may be placed in the system 1.

The VIM 50 is a physical resource management node (functional entity) that manages each of physical resources (nodes) in the NFVI 60. Specifically, it performs management of resource allocation, update and collection, association of a physical resource with a virtualized network, and management of a list of hardware resources and SW resources (hypervisor). Generally, the VIM 50 performs management for each data center (exchange). The management of physical resources is performed by a scheme corresponding to the data center. There are several types of management schemes of the data center (implementation schemes of management resources) such as OPENSTACK and vCenter. In general, the VIM 50 is placed for each data center management scheme. Specifically, a plurality of VIMs 50 that respectively manage the physical resources in the NFVI 60 by different schemes from one another are included. Note that the physical resources are not necessarily managed by different schemes for each data center.

Note that the NFVO 30, the VNFM 40 and the VIM 50 are implemented by executing a program on a physical server device (note that, however, the way of implementation on virtualization is not particularly limited, and a management system may be separated and implemented on virtualization). The NFVO 30, the VNFM 40 and the VIM 50 may be implemented by separate physical server devices or may be implemented by the same server device. The NFVO 30, the VNFM 40 and the VIM 50 (i.e. programs for implementing them) may be provided from different vendors.

The NFVO 30 receives a service allocation request from the BSS/OSS 10 and then makes a resource reservation request for slices (slices SL1, SL2 etc.) to the VIM 50. When the VIM 50 reserves resources in a server device and switches that form the NFVIs 60, the NFVO 30 defines slices for those NFVIs 60.

Further, after the NFVO 30 causes the VIM 50 to reserve resources in the NFVI 60, it stores information that defines a slice for the NFVI 60 into a table stored in the NFVO 30. Then, the NFVO 30 makes a request to install software for implementing a function required for the service to the VNFM 40. In response to the installation request, the VNFM 40 installs the software into the NFVI 60 (a node such as a server device, a switch device or a router device) that has been reserved by the VIM 50.

When the software is installed by the VNFM 40, the NFVO 30 associates the slice and the service into the table stored in the NFVO 30.

Figure 2:
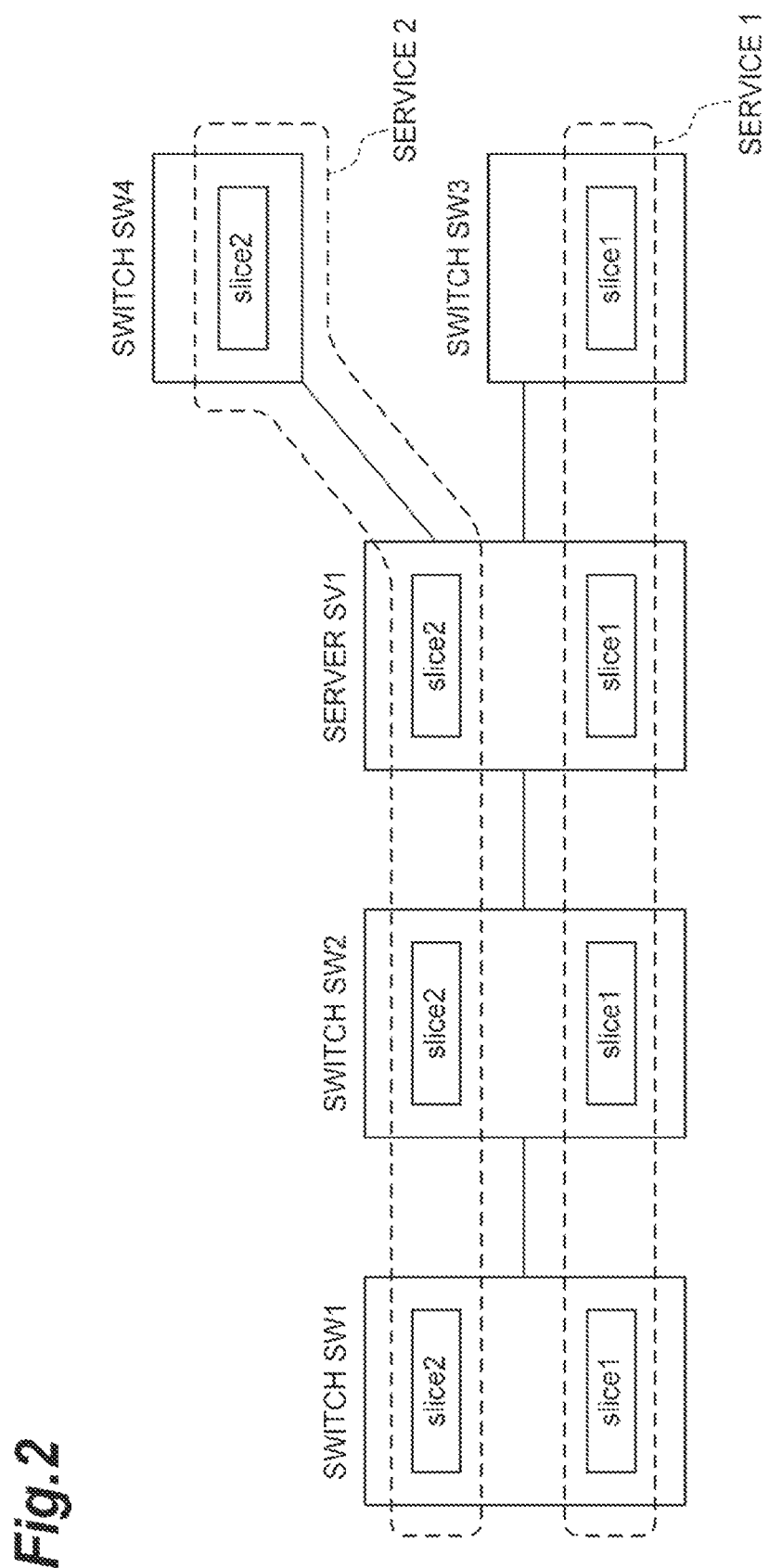
FIG. 2 is a view showing the correspondence between slices and resources.

For example, as shown in FIG. 2, when the NFVO 30 makes a resource reservation request for slices (slice 1 and slice 2) to the VIM 50, the VIM 50 gives an instruction indicating that request to a switch SW1, a switch SW2, a server SV1 and a switch SW3. Then, the switch SW1, the switch SW2, the server SV1 and the switch SW3 reserve resources for the slice 1. Likewise, in accordance with an instruction from the VIM 50, the switch SW1, the switch SW2, the server SV1 and a switch SW4 reserve resources for the slice 2.

Further, when resources are reserved in switches or the like, the NFVO 30 allocates the service 1 to the slice 1, and allocates the service 2 to the slice 2. In this manner, the NFVO 30 allocates services to the slices that are isolated from one another. Note that a plurality of services may be allocated to each slice.

After the NFVO 30 allocates a service to a slice, it transmits access information that contains the ID of this service and the address (e.g., IP address) of hardware that provides the first function of this service to the BSS/OSS 10.

When the BSS/OSS 10 receives the access information, it notifies each SBSA 70 of the access information. The SBSA 70 is a server device that can communicate with the base station 80, and when a service request is made, with a service ID, from the SU (Service User) 90 to the base station 80, the base station 80 notifies the SBSA 70 of the service ID received from the SU 90.

When the SBSA 70 receives the service ID from the base station 80, it transmits, to the base station 80, the address information of the hardware that provides the first function of the service of the access information corresponding to the service ID received from the base station 80. The base station 80 notifies the SU 90 of this address information. The SU 90 can thereby specify the address to be accessed first to use the service.

Figure 3:
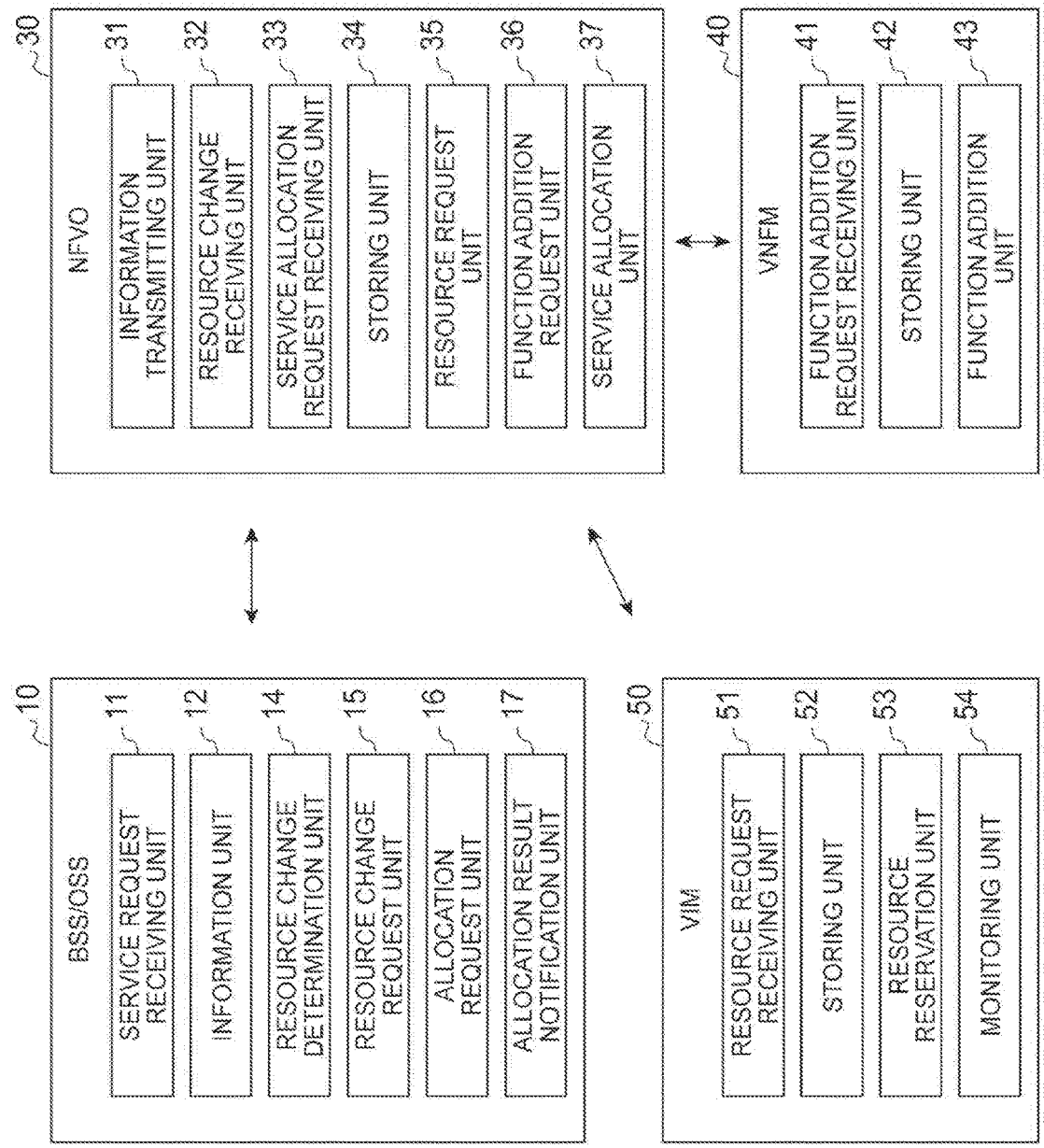
FIG. 3 is a block diagram of devices included in a system according to an embodiment of the present invention.

Hereinafter, the functions related to this embodiment of the BSS/OSS 10, the NFVO 30, the VNFM 40 and the VIM 50 are described with reference to FIG. 3. As shown in FIG. 3, the BSS/OSS 10 includes a service request receiving unit 11, an information receiving unit 12, an allocation determination unit 13 a resource change determination unit 14 (resource change means), a resource change request unit 15, an allocation request unit 16, and an allocation result notification unit 17.

The service request receiving unit 11 is a part that receives a service request containing service requirements, which are requirements for the function or performance in the service from the SO. Among the service requirements, the functional requirements are requirements related to the function for carrying out the service. To be specific, the functional requirements include the necessity of mobility control, a possible access area range and a service use time. The necessity of mobility control means whether handover control is required or not. The access area range means the range (area) where a service is provided. The service use time means a period of time when a service is used.

The performance requirements are requirements related to the performance of the slice for carrying out the service. To be specific, the performance requirements include an allowed lower limit bandwidth, an allowed delay time, a minimum packet loss rate and the like. The allowed lower limit bandwidth indicates the lower limit of the frequency band to be used for communication, the allowed delay time means the length of time a communication delay is allowed, and the minimum packet loss rate indicates an allowable packet loss rate.

Further, at the time of receiving a service request, the service request receiving unit 11 receives information indicating the function for implementing the service. The information indicating the function for implementing the service includes information for specifying the function (function identifying information, function name etc.). Further, the service request receiving unit 11 may receive software for implementing the function from the SO 20.

When the service request receiving unit 11 receives the above-described service requirements and information indicating the function for implementing the service, it transmits the service requirements to the allocation determination unit 13, and transmits the information indicating the function for implementing the service (functional information) to the allocation request unit 16. Further, at this timing, the service request receiving unit 11 notifies the information receiving unit 12 that the service request has been received. The functional information contains information for identifying a function and software for implementing the function.

The information receiving unit 12 receives information about slices from the NFVO 30 and acquires information about the utilization status of resources allocated to created slices. To be specific, when the information receiving unit 12 receives a notification about the receipt of a service request from the service request receiving unit 11, it sends a request for transmitting slice attribute information, hardware utilization status information, and slice utilization status information to the NFVO 30.

Note that the NFVO 30 stores information of a slice management table containing slice attribute information, a hardware utilization status table containing hardware utilization status information, and a slice utilization status table containing slice utilization status information. When the NFVO 30 receives the information transmission request from the information receiving unit 12, it transmits information of the slice management table, information of the hardware utilization status table and information of the slice utilization status table to the BSS/OSS 10.

FIG. 4 shows an example of the slice management table stored in the NFVO 30. The slice management table has a slice ID, an available node, the capability of mobility control, a possible access area range, a service use time, an available bandwidth, a minimum delay time, a minimum packet loss rate, a resource utilization rate, and a flag for availability of receipt of multiple services.

The slice ID is an ID for uniquely identifying a record that is determined when the NFVO 30 adds a new record to the slice management table. The available node indicates a node that is reserved by the VIM 50 (a node that constitutes the NFVI 60) as a result of making a resource reservation request to the VIM 50. Information defined by the available node includes information that identifies a node (hardware name etc.) and the amount of resources allocated in each node (a memory occupancy, a CPU occupancy rate etc.). The capability of mobility control is information indicating whether the available node is capable of mobility control or not. The possible access area range is information indicating an accessible area based on the location of the available node. The service use time is information indicating a time when a service is available based on the available node. The available bandwidth is information indicating the maximum bandwidth that can be provided in the available node.

The minimum delay time indicates the minimum delay time based on the available node. The minimum packet loss rate indicates the minimum packet loss rate based on the available resources. The resource utilization rate indicates the utilization rate of resources allocated in the current node. The flag for availability of receipt of multiple services is a value indicating whether a service that is designated to be isolated from another service is allocated or not, and when a service that is designated to be isolated from another service is allocated, information indicating that (e.g., "1") is set.

FIG. 5 shows an example of the hardware utilization status table. The hardware utilization status table has an HW name, a slice being used, allocated resources, a resource utilization rate, and excess resources. The HW name is a hardware name that can uniquely identifies a server device or a switch. The slice being used is information (e.g., slide ID) of the slice to which the device is allocated. The allocated resources are the amount of resources allocated to each slice, which are resources to be used for the existing slices. The resource utilization rate is the utilization rate of resources in each slice. The excess resources means resources that are not allocated to any slice, which correspond to an unallocated CPU core and clock frequency, an unallocated memory region, an unallocated storage capacity, and an unallocated queue.

FIG. 6 shows an example of the slice utilization status table. The slice utilization status table has a slice ID, a hardware ID, resources, a memory utilization rate, a CPU utilization rate, a storage utilization rate, and a bandwidth utilization rate. The slice ID is the ID of each slice. The hardware ID is the ID assigned to each hardware. The resources are the amount of resources allocated to each slice. The memory utilization rate is a utilization rate related to a memory of each allocated hardware. To be specific, the memory utilization rate means the ratio of a memory region that is used in a slice to the allocated memory region. The CPU utilization rate is a utilization rate related to a CPU of each allocated hardware. To be specific, the CPU utilization rate is the ratio of a CPU core and a clock frequency used in a slice to the allocated CPU core and clock frequency. The storage utilization rate is a utilization rate related to a storage of each allocated hardware. To be specific, the storage utilization rate means the ratio of a storage region that is used in a slice to the allocated storage region. The bandwidth utilization rate is a utilization rate related to a bandwidth of each allocated hardware. To be specific, the bandwidth utilization rate means a bit rate used in a slice to the maximum output bit rate of an allocated queue or a virtual MC. The bandwidth utilization rate in a server indicates the bandwidth utilization rate of a virtual MC.

The information receiving unit 12 receives information contained in the slice management table from the NFVO 30 and then transmits the information to the allocation determination unit 13. Using this information, the allocation determination unit 13 determines whether to allocate the requested service to an existing slice or to a new slice. The information receiving unit 12 receives the slice utilization status information and the hardware utilization status information and then transmits those information to the resource change determination unit 14. Using the hardware utilization status information, the resource change determination unit 14 determines whether it is possible to newly create a slice or extend an existing slice. When there are no sufficient resources to newly create a slice or extend an existing slice, the resource change determination unit 14 determines a slice where resources are to be reduced based on the slice utilization status information and the slice utilization status information.

The allocation determination unit 13 is a part that determines to which of an existing slice and a new slice the service is to be allocated based on the service requirements of the service received by the service request receiving unit 11 and the attribute of the existing slice. The allocation determination unit 13 receives the service requirements from the service request receiving unit 11 and receives the slice information from the information receiving unit 12 and, using the service requirements and the slice information, determines to which of an existing slice and a new slice the service is to be allocated.

First, in the case where the service requirements include a requirement indicating isolation from another service (isolation requirement), the allocation determination unit 13 determines to allocate the service to a new slice. On the other hand, in the case where the service requirements do not include a requirement indicating isolation from another service, the allocation determination unit 13 determines whether the attribute information of an existing slice that satisfies the service requirements exists or not.

In the case where the attribute information of an existing slice that satisfies the service requirements exists, the allocation determination unit 13 determines to allocate (accommodate) the requested service to this existing slice, and transmits this determination result to the allocation request unit 16.

Further, there is a case where it is determined that addition to a current slice is not possible even when the functional and performance requirements are satisfied based on the utilization rate of an available node. In such a case, the allocation determination unit 13 determines to extend an existing slice or add a new slice. In this case, the allocation determination unit 13 notifies the resource change determination unit 14 of this determination, and receives a determination result as to whether it is possible to extend an existing slice or add a new slice from the resource change determination unit 14.

For example, in the case where there is a slice that satisfies the functional and performance requirements other than the utilization rate of an available node, the allocation determination unit 13 determines to allocate the service to this slice, and notifies the resource change determination unit 14 of the amount of resources required for the extension (e.g., the amount of resources to be cut) and the slice to be extended.

On the other hand, in the case where there is no slice that satisfies the functional and performance requirements other than the utilization rate of an available node, the allocation determination unit 13 determines to create a new slice and allocate the service to this slice, and notifies the resource change determination unit 14 of creation of a new slice and the amount of resources required for the service.

When the allocation determination unit 13 determines to extend an existing slice or add a new slice and receives a notification that it is possible to extend an existing slice or add a new slice from the resource change determination unit 14, it sends a notification of extending an existing slice or adding a new slice to the allocation request unit 16.

After the allocation determination unit 13 determines whether to create a new slice and allocate the service, allocate the service to an existing slice, or extend an existing slice and allocate the service, it sends the result of determination to the allocation request unit 16.

In the case where the allocation determination unit 13 determines to create a new slice and allocate the service, it sends, as the result of determination, a notification of generating a new slice and the service requirements to the allocation request unit 16.

In the case where the allocation determination unit 13 determines to allocate the service to an existing slice, it sends, as the result of determination, a notification of allocating the service to an existing slice, the slice ID of the existing slice, and the service requirements to the allocation request unit 16.

In the case where the allocation determination unit 13 determines to extend an existing slice and allocate the service, it sends, as the result of determination, a notification of extending an existing slice and allocating the service, the slice ID of the existing slice, the amount of resources to be extended, and the service requirements to the allocation request unit 16.

The resource change determination unit 14 is a part that determines whether it is possible to create a new slice or extend an existing slice or not. Further, the resource change determination unit 14 is a part that, when resources are found to be insufficient as a result of trying to create a new slice or extend an existing slice, performs determination processing that determines a slice where the amount of allocated resources is to be reduced based on information of the resource utilization status. Specifically, the resource change determination unit 14 specifies a slice based on information of the resource utilization status (e.g., resource utilization rate) according to predication information of the resource utilization status by creation of a new slice or extension of an existing slice. Note that the predication information of the resource utilization status is information based on a change in the resource utilization status, and it corresponds to the amount of resources required for creation of a new slice or extension of an existing slice, a difference value between the amount of resources required for creation of a new slice or extension of an existing slice and the excess resources, for example.

The resource change determination unit 14 receives the slice utilization status information and the hardware utilization status information from the information receiving unit 12 and, using those information, determines whether it is necessary to change resources or specifies a slice where resources are to be changed.

When the resource change determination unit 14 receives a notification of creating a new slice and the amount of resources required for the service from the allocation determination unit 13, it refers to the excess resources in the hardware utilization status information and determines whether there is an amount of resources required for the service, and when there is an amount of resources required for the service, it notifies the allocation determination unit 13 that it is possible to create a new slice.

On the other hand, when the resource change determination unit 14 determines that there is no amount of resources required for the service, it refers to the slice utilization status table and determines a slice where at least one utilization rate of the memory utilization rate, the CPU utilization rate, the storage utilization rate and the bandwidth utilization rate is lower than a prestored threshold (e.g., the utilization rate is 20% or less) as a target slice for reduction. Note that the resource change determination unit 14 may determine a target slice for reduction by comparing the highest utilization rate among the plurality of types of utilization rates described above with the threshold, or may determine a target slice for reduction by comparing the average of all of the plurality of types of utilization rates described above with the threshold. The resource change determination unit 14 notifies the resource change request unit 15 of the target slice for reduction and the amount of resources to be reduced. When the resource change determination unit 14 receives a notification of completion of resource change from the resource change request unit 15, it notifies the allocation determination unit 13 that it is possible to create a new slice.

When the resource change determination unit 14 receives a notification of extending an existing slice and the amount of resources required for the extension from the allocation determination unit 13, it refers to the excess resources in the hardware utilization status information of the existing slice to be extended and determines whether the extension is possible or not, and in the case where the extension is possible, notifies the allocation determination unit 13 that it is possible to extend the existing slice.

On the other hand, in the case where there is no excess resources for extension in the existing slice to be extended, the resource change determination unit 14 refers to the slice utilization status table and, when there is hardware where at least one utilization rate of the memory utilization rate, the CPU utilization rate, the storage utilization rate and the bandwidth utilization rate in the hardware allocated to the existing slice to be extended is low (e.g., the utilization rate is 20% or less), determines this existing slice to be extended as a target slice for reduction. The resource change determination unit 14 notifies the resource change request unit 15 of the target slice for reduction and the amount of resources to be reduced. When the resource change determination unit 14 receives a notification of completion of resource change from the resource change request unit 15, it notifies the allocation determination unit 13 that it is possible to extend the existing slice.

The resource change request unit 15 is a part that makes a resource change request to the NFVO 30 based on a notification from the resource change determination unit 14. When the resource change request unit 15 receives the target slice for reduction and the amount of resources to be reduced from the resource change determination unit 14, it notifies the NFVO of the target slice for reduction and the amount of resources to be reduced and makes a resource change request. In response to the resource change request, the NFVO 30 changes resources and then sends a notification of completion of resource change to the BSS/OSS 10. The resource change request unit 15 receives the notification of completion of resource change and sends a notification of completion of resource change to the resource change determination unit 14.

The allocation request unit 16 is a part that makes a request for allocating the service to the slice determined by the allocation determination unit 13. To be specific, the allocation request unit 16 transmits a result of determination by the allocation determination unit 13 described above from the allocation determination unit 13 to the NFVO 30 and makes a service allocation request. Then, the NFVO 30 allocates the service to the slice.

The allocation result notification unit 17 is a part that receives a result of allocation from the NFVO 30. To be specific, the allocation result notification unit 17 receives a result of allocation (a result indicating whether allocation is completed or allocation cannot be done) from the NFVO 30. The information indicating completion of allocation contains the service ID and the address of an access destination. In the case where the allocation result is completion of allocation, the allocation result notification unit 17 transmits the service ID and the access destination to the SBSA 70.

The NFVO 30 includes an information transmitting unit 31, a resource change receiving unit 32, a service allocation request receiving unit 33, a storing unit 34 (resource utilization status information storage means), a resource request unit 35 (resource change means), a function addition request unit 36, and a service allocation unit 37. The information transmitting unit 31 receives an information transmission request from the BSS/OSS 10 and then transmits information of the slice management table, information of the slice utilization status table and information of the hardware utilization status table to the BSS/OSS 10.

The resource change receiving unit 32 is a part that receives, from the BSS/OSS 10, the target slice for reduction and the amount of resources to be reduced, and a resource change request. When the resource change receiving unit 32 receives the resource change request, it notifies the resource request unit 35 of the target slice for reduction and the amount of resources to be reduced and causes it to change resources. The resource change receiving unit 32 receives a notification of resource change from the resource request unit 35, and then gives a notification of resource change to the BSS/OSS 10.

The service allocation request receiving unit 33 is a part that receives, from the BSS/OSS 10, a result of determination by the allocation determination unit 13 and a service allocation request. In the case where the result of determination by the allocation determination unit 13 includes "extending an existing slice and allocating the service" or "generating a new slice", the service allocation request receiving unit 33 sends information about resources to the resource request unit 35.

Further, when the service allocation request receiving unit 33 receives a notification of resource reservation from the resource request unit 35, it gives a notification of the reservation to the BSS/OSS 10. Further, the service allocation request receiving unit 33 receives functional information at specified timing. When the service allocation request receiving unit 33 receives the functional information, it sends the functional information to the function addition request unit 36.

After the service allocation unit 37 allocates the service, the service allocation request receiving unit 33 receives a result of allocation from the service allocation unit 37 and transmits the result of allocation to the BSS/OSS 10.

The storing unit 34 is a part that stores various types of tables. The storing unit 34 stores the slice management table, the slice utilization status table, the hardware utilization status table, the service management table, and the service correspondence slice management table. FIG. 7 shows the service management table. The service management table is information based on the service requirements which the service allocation request receiving unit 33 has received from the BSS/OSS 10. The service management table has a service ID, mobility control, an access area range, a service use time, an allowed lower limit bandwidth, an allowed delay time, an allowed packet loss, a function, and an isolation flag. The service allocation unit 37 registers information where a service ID is added to the service requirements in the service management table.

FIG. 8 shows the service correspondence slice management table. The service correspondence slice management table has a service ID and a slice ID. The service allocation unit 37 registers a service ID when information is added to the service management table and a slice ID where the service is to be allocated in the service correspondence slice management table.

The resource request unit 35 is a part that makes a request for resource reservation to the VIM 50. The resource request unit 35 requests the VIM 50 to reserve resources corresponding to the amount of resources received from the service allocation request receiving unit 33. When the resource request unit 35 receives a notification of completion of resource reservation from the VIM 50, it gives the notification to the service allocation request receiving unit 33.

The function addition request unit 36 is a part that makes a request for function addition to the VNFM 40. The function addition request unit 36 requests the VNFM 40 to reserve resources corresponding to the amount of resources received from the service allocation request receiving unit 33. When the function addition request unit 36 receives a notification of completion of function addition from the VNFM 40, it gives the notification to the service allocation unit 37.

The service allocation unit 37 is a part that allocates the service. When a notification of completion of function addition is received by the function addition request unit 36, the service allocation unit 37 registers information based on the service requirements in the service management table and further registers a service ID and a slice ID in the service correspondence slice management table.

The VNFM 40 is described hereinafter. The VNFM 40 includes a function addition request receiving unit 41, a storing unit 42, and a function addition unit 43. The function addition request receiving unit 41 is a part that receives a function addition request from the NFVO 30. The function addition request receiving unit 41 notifies the function addition unit 43 that it has received a function addition request. Further, when the function addition request receiving unit 41 receives software related to an additional function from the NFVO 30, it sends this software also to the function addition unit 43.

When the function addition request receiving unit 41 receives a notification of completion of function addition after addition of a function by the function addition unit 43, it gives a notification of completion of function addition to the NFVO 30.

The storing unit 34 is a part (e.g., repository) that stores software. The storing unit 34 stores software related to communication which is likely to be used in common.

The function addition unit 43 is a part that installs a function. When the function addition unit 43 receives a function addition request from the function addition request receiving unit 41, it carries out installation to the target available node. At the time of installation, when the requested function is the function of software stored in the storing unit 42, the function addition unit 43 installs the software stored in the storing unit 42 to the available node. When, on the other hand, the function addition unit 43 receives software to be installed from the function addition request receiving unit 41, it installs the software. After the installation is completed, the function addition unit 43 gives a notification of completion of installation to the NFVO 30.

The VIM 50 includes a resource request receiving unit 51, a storing unit 52, a resource reservation unit 53, and a monitoring unit 54. The resource request receiving unit 51 is a part that receives a resource reservation request from the NFVO 30. When a resource request is received, the request is notified to the resource reservation unit 53. The storing unit 52 is a part that stores information about resources. The storing unit 52 stores information of a hardware table.

When the VIM 50 receives a request for transmitting hardware information and identification information of an available node from the BSS/OSS 10, it acquires the hardware information corresponding to the identification information of the available node from the hardware table.

FIG. 9 shows the hardware table stored in the VIM 50. The hardware table is a table that manages hardware information containing an HW name, the amount of resources, and the amount of electricity.

The HW name is identification information of hardware. The amount of resources indicates the amount of resources of the hardware such as a memory capacity and CPU capabilities (number, execution speed etc.). The amount of electricity is the amount of electricity when the entire hardware is used.

The VIM 50 receives the hardware information corresponding to the identification information of the available node from the hardware table and then transmits the information to the BSS/OSS 10.

The resource reservation unit 53 is a part that reserves resources. When a notification of a resource request is received by the resource request receiving unit 51, the resource reservation unit 53 allocates a slice based on excess resources. After reserving the resources, the resource reservation unit 53 gives a notification to the resource request receiving unit 51. The monitoring unit 54 is a part that monitors the utilization status of the NFVI 60. The monitoring unit 54 reflects a result of monitoring on the resource utilization rate.

Figure 10:
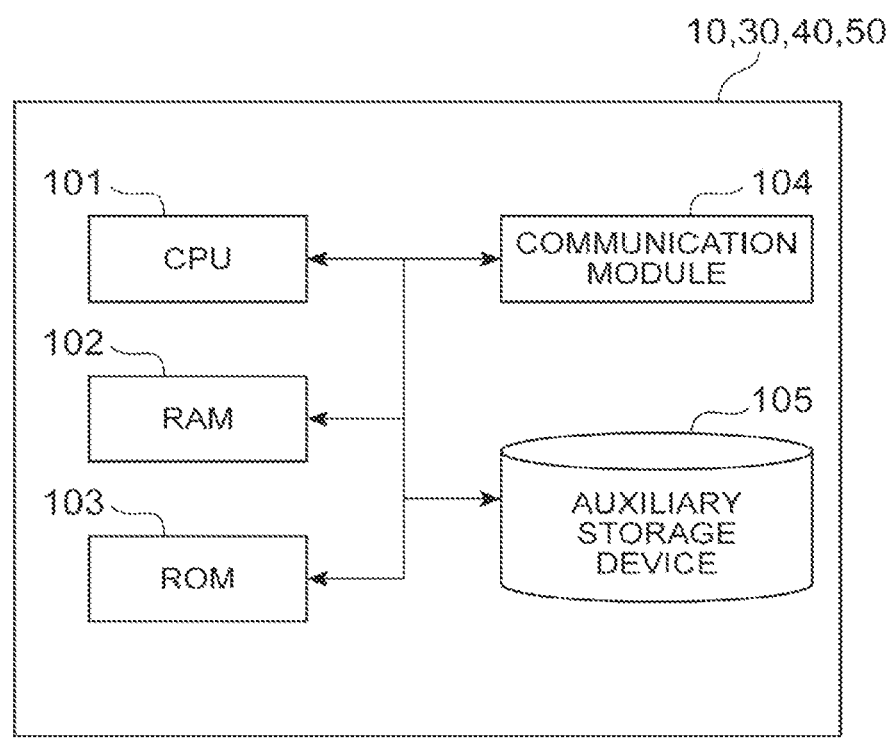

The functions related to this embodiment are described above. FIG. 10 shows the hardware configuration of a server device that implements the BSS/OSS 10, the NFVO 30, the VNFM 40 and the VIM 50. As shown in FIG. 10, the server device is configured to include a computer that has hardware such as one or a plurality of CPU 101, RAM (Random Access Memory) 102 and ROM (Read Only Memory) 103 serving as a main memory device, a communication module 104 (transmitter or receiver) for communication, and an auxiliary storage device 105 (memory) such as a hard disk. Those elements operate by a program or the like, and thereby the functions of the BSS/OSS 10, the NFVO 30, the VNFM 40 and the VIM 50 described above are implemented.

Note that, instead of executing the functions in FIG. 3 by a processor such as the CPU 101, all or some of the functions may be executed by constructing a dedicated integrated circuit (IC). For example, the above-described functions may be executed by constructing a dedicated integrated circuit for performing image processing and communication control.

Software may be called any of software, firmware, middleware, microcode, hardware description language or another name, and it should be should be interpreted widely so as to mean an instruction, an instruction set, a code, a code segment, a program code, a program, a sub-program, a software module, an application, a software application, a software package, a routine, a sub-routine, an object, an executable file, a thread of execution, a procedure, a function and the like.

Further, software, instructions and the like may be transmitted and received via a transmission medium. For example, when software is transmitted from a website, a server or another remote source using wired technology such as a coaxial cable, an optical fiber cable, a twisted pair and a digital subscriber line (DSL) and/or wireless technology such as infrared rays, radio and microwaves, those wired technology and/or wireless technology are included in the definition of the transmission medium.

Note that the BSS/OSS 10, the NFVO 30, the VNFM 40 and the VIM 50 may be implemented by a computer system that is composed of a plurality of server devices. Further, a node different from the above-described nodes included in the system 1 may be implemented by a server device having the above-described hardware configuration. Further, some or all of the functions of the base station 80 and the SU 90 (mobile communication terminal) may be implemented using hardware such as ASIC (Application Specific Integrated Circuit), PLD (Programmable Logic Device) and FPGA (Field Programmable Gate Array). Further, the base station 80 and the SU 90 may be implemented by a computer device that includes a processor (CPU), a communication interface for network connection, a memory and a computer-readable storage medium storing a program. In other words, the base station 80, the SU 90 and the like according to one embodiment of the present invention may function as a computer that performs processing related to the present invention.

The processor, the memory and the like are connected through a bus for communicating information. Further, the computer-readable recording medium is an appropriate storage medium such as a flexible disk, a magneto-optical disk (e.g., compact disk, a digital versatile disc, a Blu-ray (registered trademark) disc), a smartcard, a flash memory device (e.g., a card, a stick, a key drive), a ROM, an EPROM (Erasable Programmable ROM), an EEPROM (Electrically Erasable Programmable ROM), a CD-ROM (Compact Disc-ROM), a RAM, a register, a removable disk, a hard disk, a floppy (registered trademark) disk, a magnetic strip, a database, a server and the like. Further, the program may be transmitted from a network through a telecommunications line. Further, the base station 80 and the SU 90 may include an input device such as an input key and an output device such as a display.

The functional configurations of the base station 80 and the SU 90 may be implemented by the above-described hardware, may be implemented by a software module executed by a processor, or may be implemented by a combination of them. The processor causes an operation system to operate and controls a user terminal as a whole. Further, the processor reads a program, a software module and data from a storage medium to a memory and performs various processing according to them.

Note that the program may be a program that causes a computer to execute the operations described in the above-described embodiment. For example, a control unit of the mobile communication terminal may be implemented by a control program that is stored in the memory and operates on the processor, and another functional block may be implemented in the same manner. The system 1 according to this embodiment has the above-described configuration.

A management method, which is a process executed in the system 1 according to this embodiment, is described hereinafter with reference to the sequence chart of FIG. 11. In this example, a process in the case where the BSS/OSS 10 determines to create a new slice or extend an existing slice and allocate a service when a service start request is made from the SO 20 is described.

First, when the SO 20 makes a service start request, the service request receiving unit 11 of the BSS/OSS 10 receives the service start request (Step S1). Next, the information receiving unit 12 makes an information transmission request to the NFVO 30 (Step S2), and receives information from the NFVO 30 (Step S3). Then, the allocation determination unit 13 performs service allocation slice determination processing (Step S4). Based on this determination, the resource change determination unit 14 determines whether it is necessary to change resources (Step S5). When it is necessary to change resources, the resource change request unit 15 makes a resource change request to the NFVO 30 (Step S6). In response to the resource change request, the NFVO 30 makes a resource change request to the VIM 50 (Step S7). Receiving the resource change request, the VIM 50 changes resources (Step S8) and gives a resource change completion notification to the NFVO 30 (Step S9). The NFVO 30 receives the resource change completion notification and gives a resource change completion notification to the BSS/OSS 10 (Step S10).

The resource change request unit 15 receives the resource change completion notification from the NFVO 30 and gives a notification of resource change to the resource change determination unit 14 and, in response to this, the resource change determination unit 14 gives a notification that it is possible to create a new slice or extend an existing slice to the allocation determination unit 13. In response to this notification, the allocation determination unit 13 causes the allocation request unit 16 to make a service allocation request (Step S11).

In response to the service allocation request, the NFVO 30 creates a slice (Step S12).

The operations and effects of the system 1 according to this embodiment are described hereinafter. The storing unit 34 of the NFVO 30 stores the slice utilization status information. In the BSS/OSS 10, the allocation determination unit 13 determines to create a new slice or extend an existing slice and, when resources for creation of a new slice or extension of an existing slice are insufficient, the resource change determination unit 14 determines a slice where resources are to be reduced based on the slice utilization status information. The resource request unit 35 of the NFVO 30 reduces the resources of the determined slice.

In this case, because the system 1 reduces the amount of resources of an existing slice by using information of the utilization status of resources allocated to created slices even when resources are found to be insufficient as a result of trying to create a new slice or extend an existing slice, it is possible to dynamically adjust the amount of resources.

Further, when it is determined that resources for creation of a new slice or extension of an existing slice after receiving a service request from the SO 20, the resource change determination unit 14 determines resources to be reduced. In this case, because the system 1 carries out the reduction of resources to be allocated to a slice at the time of receiving a service request, it is possible to dynamically adjust the amount of resources so that the slice can be allocated to the service.

Although the case where the resource change determination unit 14 of the BSS/OSS 10 determines a slice where resources are to be reduced is described in the above embodiment, the NFVO 30 may make this determination.

Although the case where resources in an existing slice are reduced triggered by receiving a service request is described in the above embodiment, this may be done at specified timing. For example, whether there is a slice where resources can be reduced may be determined during stable operation. Further, resources in another slice may be reduced in order to create (extend) a slice to be used preferentially in the event of a disaster.

Although the case where the resource change determination unit 14 determines whether resources are sufficient or not based on the predication information of the resource utilization status and reduces resources in a slice when resources are found to be insufficient is described in the above embodiment, it may determine whether the probability that resources will become insufficient is high or not based on the predication information of the resource utilization status and reduce resources in a slice when it is determined that the probability of insufficient resources is high (e.g., when the amount of resources required to create a new slice is larger than a prestored threshold etc.)

Note that the term "specifying" used in this specification includes a variety of operations. For example, "specifying" can include determining, determining, calculating, computing, processing, deriving, investigating, looking up (e.g., looking up in a table, a database or another data structure), ascertaining and the like. Further, "specifying" can include resolving, selecting, choosing, establishing, comparing and the like.

Further, the description "based on" used in this specification does not mean "based only on" unless otherwise noted. In other words, the description "based on" means both of "based only on" and "based at least on".

As long as "including", "comprising" and transformation of them are used in the present specification or claims, those terms are intended to be comprehensive like the term "comprising". Further, the term "or" used in the present specification or claims is intended not to be exclusive OR.

The term "connected" or every transformation of this term means every direct or indirect connection or coupling between two or more elements, and it includes the case where there are one or more intermediate elements between two elements that are "connected" to each other. The connection between elements may be physical connection, logical connection, or a combination of them. When used in this specification, it is considered that two elements are "connected" to each other by using one or more electric wires, cables and/or printed electric connections and, as several non-definitive and non-comprehensive examples, by using electromagnetic energy such as electromagnetic energy having a wavelength of a radio frequency region, a microwave region and an optical (both visible and invisible) region.

The mobile communication terminal can be also called, by those skilled in the art, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or several other appropriate terms.

The procedure, the sequence, the flowchart and the like in each aspect/embodiment described in this specification may be in a different order unless inconsistency arises. For example, for the method described in this specification, elements of various steps are described in an exemplified order, and it is not limited to the specific order described above.

Each aspect/embodiment described in this specification may be used alone, may be used in combination, or may be used by being switched according to the execution. Further, a notification of specified information (e.g., a notification of "being X") is not limited to be made explicitly, and it may be made implicitly (e.g., a notification of the specified information is not made).

Although the present invention is described in detail in the foregoing, it is apparent to those skilled in the art that the present invention is not restricted to the embodiment described in this specification. The present invention can be implemented as a modified and changed form without deviating from the spirit and scope of the present invention defined by the appended claims. Accordingly, the description of the present specification is given merely by way of illustration and does not have any restrictive meaning to the present invention.

REFERENCE SIGNS LIST

1 . . . system, 10 . . . BSS/OSS, 11 . . . service request receiving unit, 12 . . . information receiving unit, 13 . . . allocation determination unit, 14 . . . resource change determination unit, 15 . . . resource change request unit, 16 . . . allocation request unit, 17 . . . allocation result notification unit, 20 . . . SO, 30 . . . NFVO, 31 . . . information transmitting unit, 32 . . . resource change receiving unit, 33 . . . service allocation request receiving unit, 34 . . . storing unit, 35 . . . resource request unit, 36 . . . function addition request unit, 37 . . . service allocation unit, 40 . . . VNFM, 41 . . . function addition request receiving unit, 42 . . . storing unit, 43 . . . function addition unit, 50 . . . VIM, 51 . . . resource request receiving unit, 52 . . . storing unit, 53 . . . resource reservation unit, 54 . . . monitoring unit, 60 . . . NFVI, 70 . . . SBSA, 80 . . . base station, 90 . . . SU, 101 . . . CPU, 102 . . . RAM, 103 . . . ROM, 104 . . . communication module, 105 . . . auxiliary storage device

The invention claimed is:

1. A slice management system that manages slices being virtual networks created on a network infrastructure, comprising:
processing circuitry configured to
receive a service request containing service requirements, wherein, functional requirements include mobility control, access area control and service use control, and performance requirements which include an allowed lower limit bandwidth, an allowed delay time and a minimum packet loss rate;
receive service requirements and slice information, use the service requirements and the slice information, and determine to which of an existing slice and a new slice the service is to be allocated;
store, in a resource utilization status information storage, information of a utilization status of resources allocated to created slices;
store, in a hardware utilization status information storage, information of a utilization status of hardware used for constructing the slice; and
specify a slice based on the information of the resource utilization status stored in the resource utilization status information storage and the information of the hardware utilization status information storage in accordance with predication information of the resource utilization status by creation of the new slice or an extension of the existing slice, and reduce an amount of resources allocated to the existing slice when resources are found to be insufficient from the information of the resource utilization status and the prediction information.

2. The slice management system according to claim 1, wherein the processing circuitry is further configured to specify the slice where resources are to be reduced when resources for creation of the new slice or extension of the existing slice are found to be insufficient as a result of responding to a request for allocating the slice to a service using the virtual networks.

3. A slice management method executed in a slice management system that manages slices being virtual networks created on a network infrastructure, comprising:
a service request receiving step for receiving a service request containing service requirements, wherein, functional requirements include mobility control, access area control and service use control, and performance requirements which include an allowed lower limit bandwidth, an allowed delay time and a minimum packet loss rate;
an allocation determination step for receiving service requirements and slice information that, using the service requirements and the slice information, and determining to which of an existing slice and a new slice the service is to be allocated;
storing, in a hardware utilization status information storage, information of a utilization status of hardware used for constructing the slice; and
a resource change step of specifying a slice based on information of a utilization status of resources allocated to created slices and the information of the hardware utilization status information storage in accordance with predication information of the resource utilization status by creation of the new slice or the extension of the existing slice, and reducing an amount of resources allocated to the existing slice when resources are found to be insufficient from the information of the resource utilization status and the prediction information.

4. The slice management method according to claim 3 wherein the resource change step specifies the slice where resources are to be reduced when resources for creation of the new slice or an extension of the existing slice are found to be insufficient as a result of responding to a request for allocating the slice to a service using the virtual networks.

* * * * *